R. J. PATON.
LUBRICATING MEANS.
APPLICATION FILED NOV. 8, 1919.
1,379,282.
Patented May 24, 1921.
2 SHEETS—SHEET 1.
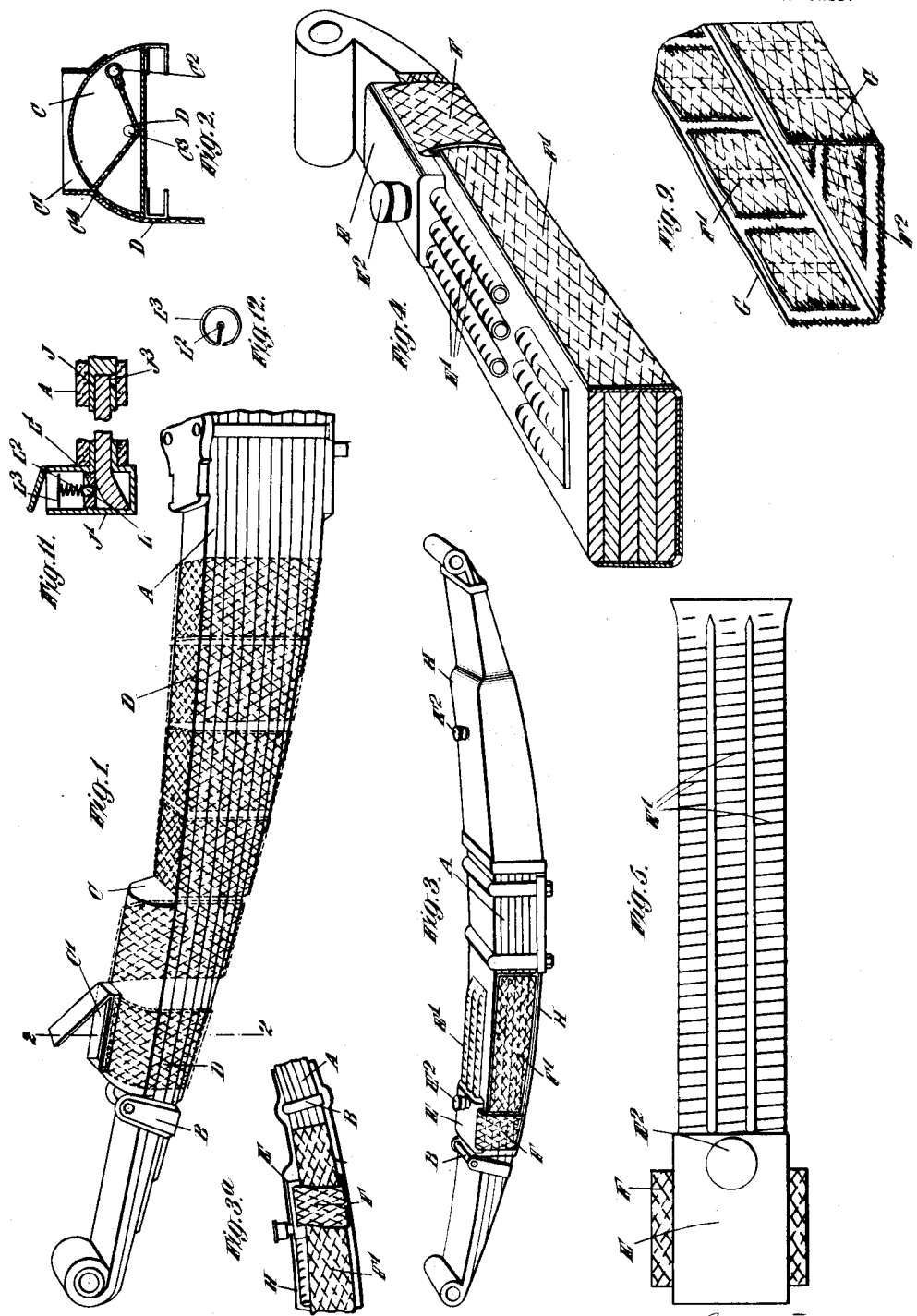

R. J. PATON.
LUBRICATING MEANS.
APPLICATION FILED NOV. 8, 1919.
1,379,282.
Patented May 24, 1921.
2 SHEETS—SHEET 2.
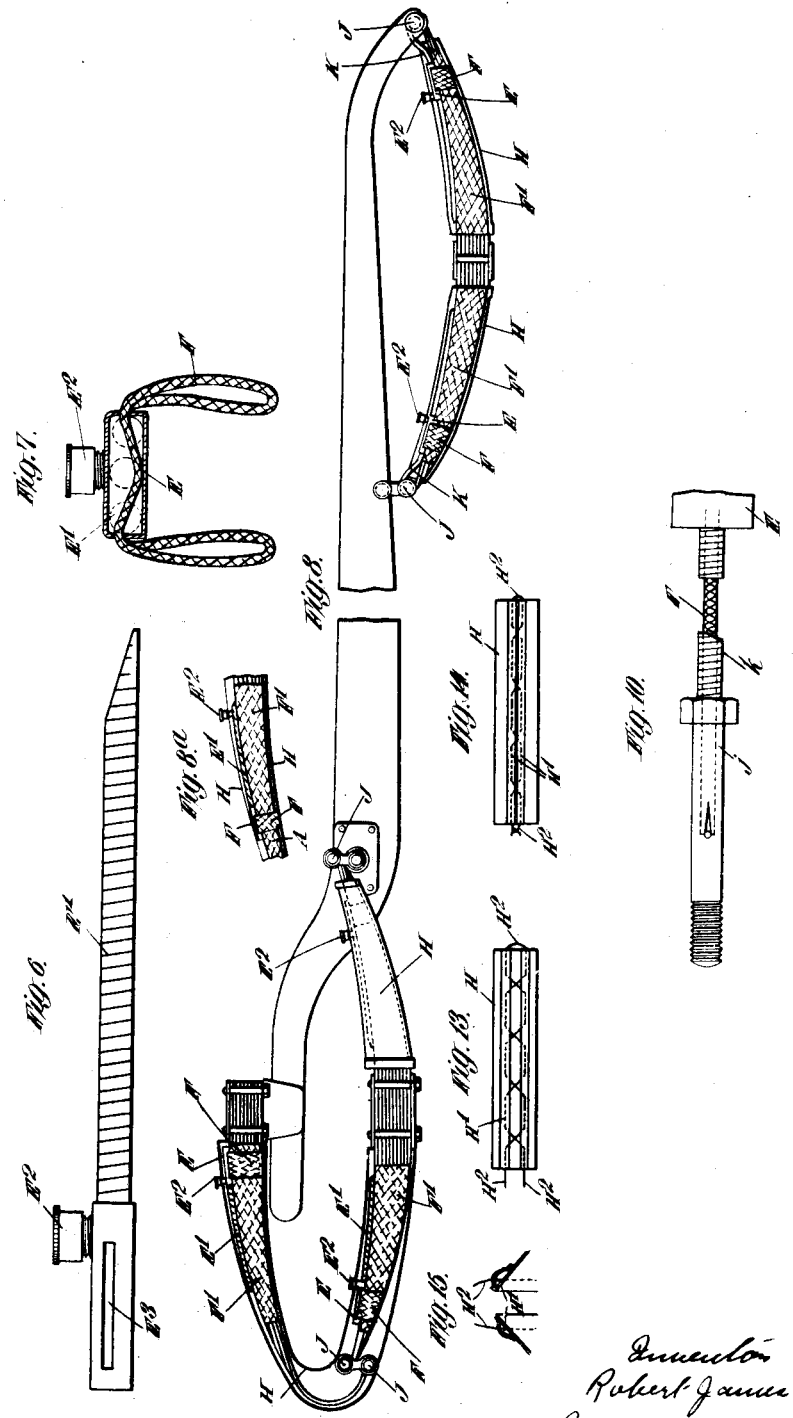

UNITED STATES PATENT OFFICE.

ROBERT JAMES PATON, OF BEDFORD PARK, LONDON, ENGLAND.

LUBRICATING MEANS.

1,379,282.     Specification of Letters Patent.     Patented May 24, 1921.

Application filed November 8, 1919. Serial No. 336,678.

*To all whom it may concern:*

Be it known that I, ROBERT JAMES PATON, a subject of the King of Great Britain, residing at 70 Abinger road, Bedford Park, in the county of London, England, have invented certain new and useful Improvements in or Relating to Lubricating Means, of which the following is a specification.

This invention relates to lubricating means, for laminated springs and/or shackle bolts being to provide improvements whereby the oil is economically used.

According to this invention, the improved means for lubricating laminated springs, comprise one or more oil boxes, reservoirs or containers of any suitable kind (hereinafter termed reservoirs) and a wick (or wicks) or other similar or suitable material (hereinafter termed "the wick") which is immersed in the oil contained in the reservoir, and extends through an opening or openings in the reservoir so as to enable the oil to seep or to be conveyed along the wick to the parts of the spring requiring lubrication. By means of this invention the oil is contained in a receptacle and can only escape therefrom through the openings through which the wicks are passed so that the oil is gradually used only as and when required by the seeping of the oil along the wick and the creeping of the oil along the surfaces requiring lubrication. In this manner the surfaces are continuously and automatically supplied with oil from the reservoir as required and the oil is not free to spread all over the spring as in prior proposals, in one example of which felt is wrapped around the spring and a plate having grooves or ducts which extend to the surrounding felt for conducting the oil to the felt. The reservoir in the present invention may be so constructed as to enable them to be flexed or shaped to suit the curvature of the spring and the wick or wicks immersed in the oil may be in contact with or connected to other wicks extending along the sides of the spring. The wicks supplying oil to the springs may be arranged to supply oil to the horizontal shackle bolts of the springs, or separate wicks may be used. Separate or independent means for lubricating the horizontal shackle bolts may be provided which means may be used in conjunction with or independently of the lubricating means for the laminated springs, although I do not cover the method of lubricating bolts or pins in general as it has already been proposed to lubricate a vertical fulcrum pin by forming an oil groove in the upper end of the pin and conveying the oil through a wick from the groove to the surface requiring lubrication by siphonic and capillary action.

In order that the invention may be clearly understood and readily carried into effect, the same will now be described more fully with reference to the accompanying drawings, in which:—

Figure 1 is a fragmentary view of a portion of the spring with one construction of oil reservoir applied thereto and showing a wick extending therefrom.

Fig. 2 is a cross sectional view taken approximately on the line 2—2 of Fig. 1.

Fig. 3 is a perspective view of a spring showing a modified construction of oil reservoir. Fig. 3ª shows a modification in connection with the gaiter or outer cover.

Fig. 4 is a fragmentary perspective view of a portion of a spring with an oil reservoir shown in Fig. 3 supplied thereto but drawn to a larger scale.

Figs. 5, 6 and 7 are respectively a plan, a side view and a cross sectional view of the reservoir illustrated in Figs. 3 and 4.

Fig. 8 illustrates the invention applied to the front spring and a rear three-quarter elliptical spring of a motor vehicle chassis. Fig. 8ª illustrates a modification hereinafter referred to.

Fig. 9 illustrates one arrangement of the wick which may be employed for the springs.

Fig. 10 illustrates one construction of the improved device for lubricating the shackle bolts.

Figs. 11 and 12 illustrate modifications of the improved device for lubricating the horizontal shackle bolts.

Figs. 13, 14, and 15 show one construction of cover or gaiter for securing around the spring to inclose the lubricating means.

Referring to Fig. 1, A represents a laminated spring of any usual construction; B represents one of the spring clips situated near the end of the spring and C is an oil reservoir which as shown is disposed near the spring clip B and is provided with a filling opening C' through which oil can be supplied to the reservoir. D represents the wick extending from the reservoir C one end of which wick is secured to a pin C² in the reservoir, the wick being disposed under a pin C³ from which it is led through a slot C⁴ in the upper part of the reservoir. The wick D after passing through the slot C⁴ may be wound around the spring as shown in Fig. 1, the other end of the wick being fixed or retained on the spring in any suitable manner near the middle part of the spring. The other part of the spring beyond the middle portion may be provided with a similar arrangement and each part of the spring carrying an oil reservoir and provided with the wick may be suitably covered with an oil proof material which may be surrounded by any suitable type of gaiter laced or otherwise secured in position as more particularly described in connection with the other modifications. By reason of the wick passing under the pin C³ it is immersed in the oil contained in the reservoir so that the oil seeps along by the wick which being in contact with the sides of the spring enables the oil to creep between the laminæ and thus lubricate the surfaces thereof.

With reference to the modification illustrated in Fig. 3, the oil reservoir comprises a flat box E and any suitable number (three being shown) of metallic flexible tubes E' connected to the box E and if desired joined at their outer ends, the said tubes E' and the box E constituting the oil reservoir. A suitable filling opening and cap E² is provided on the box E for enabling the oil to be supplied to the interior box and the flexible tubes. In the opposite sides of the box E slots E³ are provided through which is passed a strip of wick F as shown in Fig. 7, the ends of the wick being shaped to form loops as shown in this figure, and also in Fig. 4 the part of the wick in the box being immersed in the oil contained therein. In this example wick strips F' may be provided at the two sides of the spring, the outer ends of the strips being passed through the loops in the wick F as shown more particularly in Figs. 3 and 4 so that the wick F extending from the box E is in intimate contact with the wick strips F' for enabling the oil seeping through or absorbed by the wick F to be also absorbed by the strips F' so that the oil can be allowed to creep between the laminæ of the spring and thus lubricate the surfaces thereof. In this modification the wick strips F' are conveniently mounted upon a backing G, see Fig. 9 of suitable material and they may be constituted by a series of pieces, the strands of which are arranged to lie approximately parallel with the laminæ of the spring, i. e. in a longitudinal direction relatively to the spring. If desired the backing G may carry a wick strip or portions F² which lies against the under side of the spring when the backing is placed in position with the wicks F' at the sides of the spring and in contact with the wick F, the whole being secured in position by winding tape or covering the same with any suitable oil proof material. The whole may be surrounded by a leather gaiter H as shown in Figs. 3 and 8, which may be shaped to fit on the two parts of the spring beyond the middle part, the said gaiters being laced and/or strapped into position, in any suitable manner the lacing or the like being located on the under side of the spring. The gaiter may be blocked or shaped at suitable parts to fit neatly over such projecting parts as the spring clip B and the reservoir and it may have a hole through which the filling cap projects so that oil can be supplied as and when required without dismantling the device. The oil reservoirs may be arranged in any convenient position on the spring, and the metallic flexible tubing E' permits of the same being bent or shaped to suit the curvature of the spring. Fig. 3ª shows a leather gaiter which is provided with a specially blocked or raised part to fit over the spring clip B, such blocked part being made in one piece with the gaiter or sewn or riveted in position.

In the modification illustrated in Fig. 8, the front spring is provided with lubricating means substantially as shown in Fig. 3 and the three-quarter elliptical spring at the rear of the chassis may be provided with three oil reservoirs E, two of which are arranged on the lower part of the spring while one is provided on the upper part of the spring as shown. A cover or gaiter H surrounds the front part of the lower spring portion and rear part of the lower spring and the upper spring may be inclosed by a single cover H which is suitably shaped to fit around these portions of the spring as shown in Fig. 8. The construction of gaiter H illustrated in Figs. 13 to 15 comprises improved means for securing it in position around the spring. The adjacent edges of the gaiter are each formed with a tubular part H' through which a lace or laces H² may be threaded and crossed at intervals from one tubular edge to the other as shown in Fig. 13, the free ends of the lace which extend from one end of the gaiter being adapted to be pulled to draw the tubular edges of the gaiter together when the free ends of the lace can be tied to secure the tubular edges close together. It is preferred to arrange the reservoir for the upper spring as shown in Fig. 8ª and in this case the ends of flexible tubing E′ may be provided with the filling cap E².

By providing reservoirs or containers as hereinbefore set forth, the oil is confined within the limits of the reservoir or container and is only withdrawn from the same by seeping through the wick from which the oil is supplied between the laminæ of the spring as may be required, thus insuring effectual lubrication of the spring without at any time supplying undue quantity of oil to the wick and to the spring. Various modifications and arrangements may be made; for example one reservoir may be provided on each spring at the middle part, the wicks extending therefrom to the ends of the spring or one reservoir may be provided at one or other of the ends of the spring with the wicks extending along the whole length of the spring. In some cases the oil reservoirs may be supplied with oil from a central container mounted on the chassis or car, the reservoirs being connected to the common container by suitable tubes, or the wicks may extend direct from a common container or reservoir to the springs thus avoiding the necessity of providing oil reservoirs on the springs.

The shackle bolts of the springs as shown at J in Fig. 8 may be lubricated by providing wicks which may be contained in tubes from an oil reservoir E′, the wick being immersed in the oil and passed into the interior of the hollow horizontal shackle bolts as shown more particularly in Fig. 10 which illustrates a separate attachment such as may be used for lubricating the horizontal shackle bolts independently of the means for lubricating the springs. In the modification shown in Fig. 11 the horizontal shackle bolt J is formed with a cup or receptacle J′ constituting the oil reservoir which is in communication with an axial passage in the bolt, a passage containing a wick F extending from the oil reservoir and passing through an opening or hole J³ so that the wick may convey the oil to the eye or loop of the laminated spring surrounding the bolt. The cup J′ may be provided with an automatic valve arrangement which comprises a ball maintained against a seating L′ by a light spring L² interposed between the ball and a stop L³ formed of wire fixed in the reservoir. The oil is poured into the reservoir and normally is prevented from flowing to the lower part of the receptacle by the ball valve L′ although during the running of the car the vibration set up is sufficient to displace the ball from its seating so that the oil can be admitted to the lower part of the reservoir so that the wick is immersed in the oil and conveys the oil from the reservoir to the parts requiring lubrication.

What I claim and desire to secure by Letters Patent of the United States is:—

1. The combination with a laminated spring, of an oil reservoir disposed within the limits of the width of the spring, a wick within the reservoir and extending through an opening in the latter to the sides of the spring, so that oil in the reservoir will seep along the wick through the aforesaid opening, and a cover surrounding the spring and inclosing the reservoir and wick.

2. The combination with a laminated spring, of an oil reservoir mounted on the spring and having an opening in one of its walls, a wick extending longitudinally along a side of the spring, and a wick extending into the reservoir and through said opening into contact with the first said wick, and a cover or gaiter surrounding the spring and inclosing the reservoir and wicks.

3. The combination with a laminated spring, of an oil reservoir mounted on the spring and provided with openings in its opposite side walls, wicks lying against the sides of the spring, a wick extending through the reservoir and having its ends projecting from said openings therein into contact with the first said wicks, and a cover or gaiter surrounding the spring and inclosing the reservoir and wicks.

4. The combination with a laminated spring, of a flexible oil reservoir or container mounted on the spring and provided with an opening in one of its walls, a wick extending through said opening into the reservoir and having the portion thereof outside of the reservoir in contact with the sides of the members of the spring, and a cover laced along the length of the spring and inclosing the reservoir, wick and spring.

5. The combination with a laminated spring, of an oil reservoir mounted on the upper surface of the spring and having an opening in one of its walls, a wick extending through the opening in the reservoir and having the portion thereof outside of the reservoir formed into a loop which contacts with a side of the spring, a second wick extending longitudinally of the side of the spring through said loop in the wick carried by the reservoir, and a cover or gaiter surrounding the spring, reservoir and wicks.

6. The combination with a laminated spring, of an oil reservoir mounted on the spring and provided with an opening in one of its walls, a wick extending through said opening in the reservoir and having a portion thereof in contact with a side of the spring, an oil-proof cover for the wick and spring, and a gaiter inclosing the reservoir, wick and spring, the free edges of such gaiter being tubular and provided with laces that can be drawn tight to bring the tubular edges together and secure the gaiter in position.

7. The combination with a laminated spring, of an oil reservoir mounted on the spring and having an opening in one of its walls, a removable filling cap on the reservoir, a wick extending through the opening in the reservoir wall and having a portion thereof outside of the reservoir contacting with a side of the spring, and a cover or gaiter shaped to fit over the reservoir wick and spring and provided with an aperture through which the filling cap of the reservoir extends.

ROBERT JAMES PATON.